Nov. 19, 1963
E. A. VOISIN
3,111,442
METHOD AND APPARATUS FOR PROVIDING TEMPERATURE
AND ABLATION RESISTANT STRUCTURES
Filed Feb. 5, 1960
2 Sheets-Sheet 1
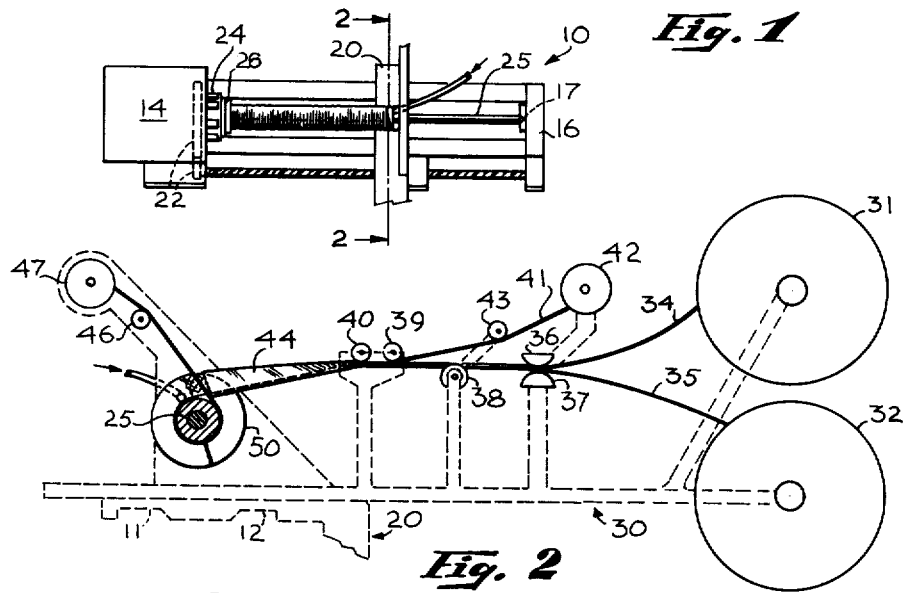
*Fig. 1*
*Fig. 2*
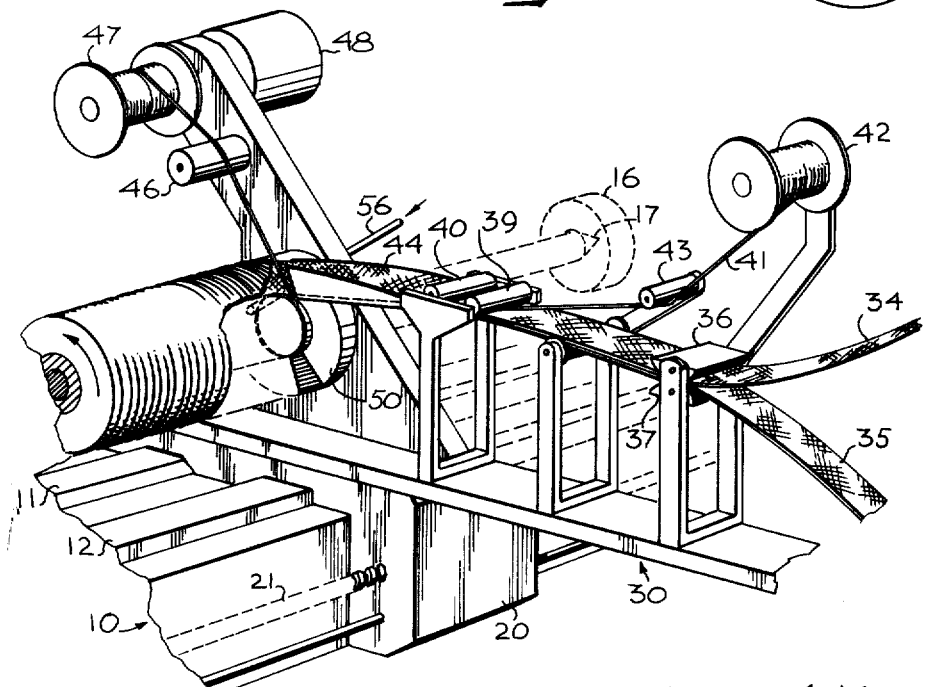
*Fig. 3*
ERNEST A. VOISIN
INVENTOR.
BY Fraser and Bogucki
ATTORNEYS

ERNEST A. VOISIN
INVENTOR.

BY Fraser and Bogucki

ATTORNEYS

United States Patent Office

3,111,442
Patented Nov. 19, 1963

3,111,442
METHOD AND APPARATUS FOR PROVIDING TEMPERATURE AND ABLATION RESISTANT STRUCTURES
Ernest A. Voisin, Torrance, Calif., assignor to H. I. Thompson Fiber Glass Company, Los Angeles, Calif.
Filed Feb. 5, 1960, Ser. No. 6,982
13 Claims. (Cl. 156—192)

This invention relates to methods and apparatus for fabricating shaped structures having high temperature characteristics, and more particularly to a new and improved method and apparatus for fabricating fiber reinforced structures in the form of surfaces of revolution, in which the fibers are disposed in a predetermined fashion to resist temperature and ablation effects.

In airborne or rocket driven craft, in industrial applications and in laboratory uses, there is an increasing demand for structures which maintain mechanical strength and physical integrity in a high temperature environment. There is a particular demand for structures which have high resistance to the ablation and erosion which occur when the structures are exposed to moving high temperature gases.

A particularly useful combination of properties for high temperature applications is provided by high silica content materials. Silica has a high melting point and a high heat of vaporization, as well as excellent viscosity and thermal characteristics at its melting point. These properties are usually best utilized in shaped structures in which vitreous silica fibers are used as reinforcements in an impregnated structure. Such silica fiber reinforced structures are often employed in many modern rocket nozzles, jet engine liners, and similar applications.

While the present invention is principally concerned with silica fiber structures, methods and machines in accordance with the invention may utilize other fibers, such as nylon. The fibers may additionally or alternatively be in textile, roving, mat or other form.

A significant development which has been made in the use of silica fiber reinforced structures pertains to the directions and attitudes in which the layers of material are disposed relative to the exposed surface. The structure is usually built up of laminations, as of successive layers of cloth. It has been shown that when these laminations are at an angle which is inclined toward the direction of movement of the adjacent gases, the structure is more resistant to heat erosion effects than it is when the laminations are disposed parallel to the direction of movement of the gases, or inclined in a direction opposite to the direction of movement of the gases. Control of the direction of lamination in this manner avoids the tendency of the laminations to burn through and to rapidly peel off.

A related and also significant part of the control of fiber disposition is the direction of orientation of the individual fibers relative to the exposed surface. It has been shown that if only an end of the fiber is presented at the exposed surface, there is a further appreciable increase in the resistance to ablation. With such a construction each fiber is anchored in the cold region, so that only the exposed end melts away, and the interlocking relationship of the fibers and the total strength of the structure are not affected disproportionately, as they would otherwise be, by erosion at the exposed surface.

A number of problems have been encountered in fabricating structures in which the fibers are properly oriented as well as disposed in selected directions of lamination. A principal difficulty arises from the fact that silica fiber materials of sufficient purity are relatively expensive, so that many techniques have been found to be prohibitive in cost because of excessive waste material. The use of specially woven configurations has also been found to be prohibitively costly.

Difficulties are also encountered because of the necessity of providing structures which have high and uniform density along their length. Clearly, the greater the content of silica fibers per unit volume, the greater will be the temperature and ablation resistance of the structure. Uniformity problems are materially increased because the woven silica fiber cloths which are usually employed as the raw material vary appreciably both in thickness and tackiness. The cloths are usually impregnated, as with a resin coating, but it has not been found possible to achieve effective control over the thickness of the cloth and the tackiness, or surface adhesive properties, of the cloth. When building up structures of this material, therefore, these variable factors have often caused wide variations in density and cracking of the structure in subsequent processing.

It has been shown, in a previously filed application for patent, filed January 11, 1960, Serial No. 1,554, by Hector R. Barrios et al., that the above difficulties may be minimized by a technique in which strips of silica fiber material may be wound upon a rotating central form and partially densified by axial compression during the winding process. As described in the Barrios et al. application, structures having the desired individual fiber dispositions may be provided rapidly, uniformly and with a minimum of waste material by this technique. It is desirable, however, to be able to achieve similar results automatically. It will be recognized that if a structure can be formed by mechanical means alone, it is possible to increase markedly the speed of the operation, to achieve consistency of product, and hence reduce both the cost of the product and the rate of rejections.

Therefore, it is an object of the present invention to provide new and improved machines and methods for substantially automatically forming temperature and ablation resistant structures of fiber reinforced materials in which the fibers are disposed in a predetermined fashion.

Another object of the present invention is to provide a new and improved machine for rapidly and reliably forming a temperature and ablation resistant structure with a minimum wastage of material.

Yet another object of the present invention is to provide an improved machine for fabricating a silica fiber reinforced structure in which the fibers lie in laminations having a controlled direction with respect to a selected surface of the structure, and in which the individual fibers are disposed with an end grain orientation relative to the selected surface.

A further object of the present invention is to provide an improved method for fabricating hollow walled structures in the form of surfaces of revolution by steps which are rapidly and relatively economically carried out to provide a superior product.

It is a further object of the present invention to provide an improved method for fabricating temperature and ablation resistant structures of high density and good uniformity from silica fiber reinforced cloth material.

In accordance with one aspect of the invention, strips of fiber material are wound under tension upon a rotating central form utilizing a filamentary guide material. By folding the strips along their length about the filamentary material, a ring laminated structure may be built up helically upon the rotating central form at a rapid rate and with positive control over the addition and disposition of the strip material.

For example, a machine in accordance with the invention may employ a rotating mandrel around which bias-cut strips of material are wound. The strip material is fed to the vicinity of the mandrel along with a guide filament, about which the strip is folded. The guide filament is passed once about the mandrel and withdrawn by a takeup reel which maintains the guide filament under pressure. The entire mechanism for feeding and guiding the strip material and the guide filament is mounted on a carriage which moves at a controlled rate along the mandrel as the material is added on. A metal die is also mounted on and movable with the carriage, the die having a shaped surface which serves both to guide the filament into place about the mandrel and to maintain the structure which is being wound under axial compression. The axial rates of movement of the carriage mechanism and the metal die along the mandrel are selected to be such that the wound structure is partially densified and made uniform along its length.

In accordance with another aspect of the invention, a method of fabricating high temperature and ablation resistant structures is provided which employs silica fiber cloth having a resin coating which is partially cured. The cloth is cut into strip segments on a bias, and the segments are joined together in end to end relation with adjacent ends overlapping, by heating the overlapping ends under pressure and maintaining the pressure until the resin coating has further cured at the overlap region. The strips are then wound about the rotating central form together with the guide filament, which is maintained under tension as the strips are folded about the filament. The guide filament thus securely fits the strip material into place. After a structure has been fully built up on the rotating central form the entire structure may be further densified, cured while still on the form, and then removed and machined to final dimensions.

In accordance with still another aspect of the invention, the filamentary material which is employed as a guide for the strip material may either be fed into the wound structure and machined out during a final machining, or withdrawn during the course of the winding process. To increase the speed with which the operation is carried out, the arrangement may be disposed such that double layers of strip material are folded about the guide filament and simultaneously wrapped about the mandrel. In addition, the arrangement of the metal die may be such that resin powder accumulated during the winding process is blown off so as to maintain uniform operation.

A better understanding of the invention may be had by reference to the following description taken in conjunction with the accompanying drawings, in which:

FIG. 1 is a simplified plan view of a machine for fabricating temperature and ablation resistant structures in accordance with the invention;

FIG. 2 is a schematic side sectional representation taken along line 2—2 of FIG. 1 showing in simplified form some of the elements of the arrangement of FIG. 1;

FIG. 3 is a perspective representation, partially broken away, of a portion of the machine of FIGS. 1 and 2;

Figure 4:
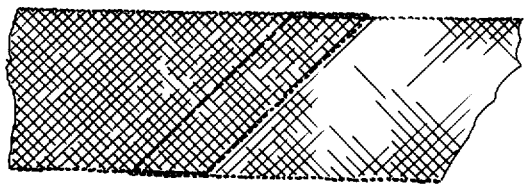
FIG. 4 is a fragmentary view of a segment of strip material which may be employed with the arrangement of FIGS. 1-3, illustrating the overlapping arrangement of adjacent segments of strip.

The principal elements of a machine in accordance with the invention are shown in the simplified views of FIGS. 1-3, to which reference may now be made. The elements which are employed are mounted upon a base 10 having longitudinal ways 11, 12 (best seen in FIG. 3). A motor 14 is mounted at one end of the base 10 (FIG. 1), and a tail stock 16 including a centering hole 17 is mounted at the other end of the base 10. The axis which is substantially parallel to the ways and which extends between the center of rotation of the motor 14 and the centering hole 17 in the tail stock 16 will be referred to as the central or working axis of the machine.

A carriage 20 is mounted transversely across the ways 11, 12, and includes grooved portions registering with the ways 11, 12 so that the carriage 20 is longitudinally movable along the working axis of the machine. A lead screw 21 which is mounted at one side of the base 10 and extends longitudinally therealong is coupled by a mechanical drive 22 (indicated generally in FIG. 1) to the motor 14. The mechanical drive 22 is shown in simplified form and may consist of a gear train, a sprocket and drive mechanism or other suitable drive means. The lead screw 21 is operatively associated with an appropriately threaded aperture in the carriage 20, so that the carriage 20 is driven by the motor 14. Thus, as the motor 14 rotates, the lead screw 21 drives the carriage 20 along the base 10 at a selected rate which is related to the speed of rotation of the motor 14. If desired, a change speed mechanism (not shown) may be employed in the mechanical drive 22 to enable the rate of movement of the carirage 20 to be varied.

A chuck mechanism 24 coupled to the motor 14 is arranged to support one end of a mandrel 25 which is mounted along the central axis. The mandrel 25 includes a layup ring 26 facing toward the tail stock end of the base 10 and terminates at the tail stock 16 in a taper which registers with the centering hole 17. Thus, the mandrel 25 rotates concentrically about the central working axis, driven by the motor 14.

A frame 30 (FIGS. 2 and 3) which is mounted on and fixed to the carriage 20 includes support members to which various other elements are coupled for movement with the carriage 20. A pair of strip feed reels 31, 32 are mounted rotatably on the frame 30 at a point spaced apart from the mandrel 25. Strip materials 34, 35 are rolled upon the center hub of each of the strip feed reels, 31, 32 and fed therefrom in a direction toward the mandrel 25.

The strips 34, 35 which are employed are, in the present example, formed from bias cuts of resin coated silica fiber cloth. The strips might also comprise roving material, mat material or other suitable material. A primary characteristic of the strip employed is that it preferably should provide a distortable tape, no matter which specific material is chosen. It will be understood by those skilled in the art that the strip feed reels 31, 32 may include such conventional elements as are desired for operative convenience, including restraining elements to keep the reels 31, 32 from freely turning.

Between the strip feed reels 31, 32 and the mandrel 25 are mounted a succession of guide elements which assist in the automatic control of the movement of the strips 34, 35 from the reels 31, 32. A pair of metal, curved strip elements 36, 37 define a channel which receives the strips 34, 35 in facing and adjacent relation. Between the opposed strip guide elements 36, 37 and the mandrel 25 are a succession of Teflon guide rollers 38, 39, 40 which are mounted along the path of movement of the strips 34, 35. The rollers 38–40 are rotatably mounted on attachment elements which extend from the frame 30, and because of the low coefficient of friction of Teflon, suitably control the positioning of the strips 34, 35 without sticking or drawing off parts of the resin coating on the surface of the strips 34, 35.

Figure 8:
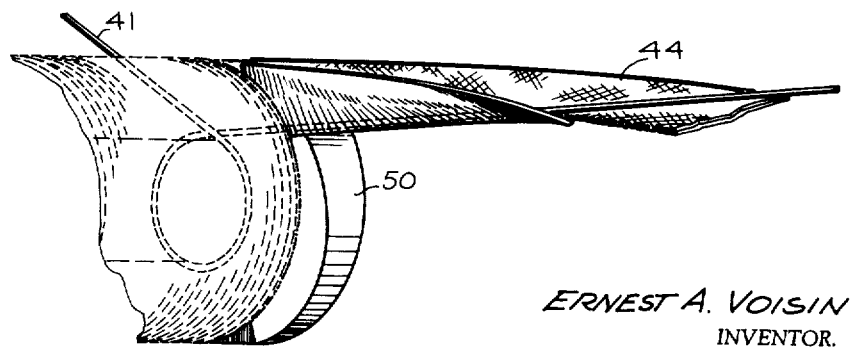
FIG. 8 is a fragmentary perspective view similar to FIG. 7 showing other details thereof.

A filamentary guide element, here chosen as a guide wire 41 is wrapped about a guide wire feed reel 42 and fed so as to be partially coextensive with the strip material 34, 35. The guide wire feed reel 42 is spaced apart from the mandrel 25, and is rotatably mounted on the frame 30. The guide wire 41 passes through suitable grooves or apertures in a guide wire positioning element 43 and thence between the second and third guide rollers 39 and 40 along with the strip material 34, 35. The guide wire 41 is thus centrally placed adjacent and parallel to the strips 34, 35. Between the guides 38–40 and the mandrel 25, both the strips 34, 35 and the guide wire 41 pass through an elongated Teflon fold guide 44, best seen in FIG. 3 and FIG. 8. The Teflon fold guide 44 is shaped to fold both of the strips 34, 35 along their length about the guide wire 41, and to direct the guide wire 41 so that it proceeds tangentially toward the mandrel 25.

The guide wire 41 is in this arrangement passed once about the mandrel 25 and thereafter fed through a guide groove or aperture in a takeup guide 46 to a takeup reel 47. A constant torque motor 48 coupled to the frame 30 along with the takeup reel 47 drives the reel 47 so as to maintain a constant tension on the guide wire 41. The torque exerted by the motor 48 is selected to be sufficient to draw the guide wire 41 and thus the strips 34, 35 tightly against the mandrel 25.

In an alternative arrangement, as may readily be visualized, the guide wire 41 may be anchored in the region of the layup ring 26 of the mandrel 25, and then continuously wound upon the mandrel 25 with the strips 34, 35. Such a continuous winding is preferably employed in those instances in which the direction of lamination is such that the wire may not readily be withdrawn without disturbing the strip material as it is wound upon the mandrel.

Figures 6, 7:
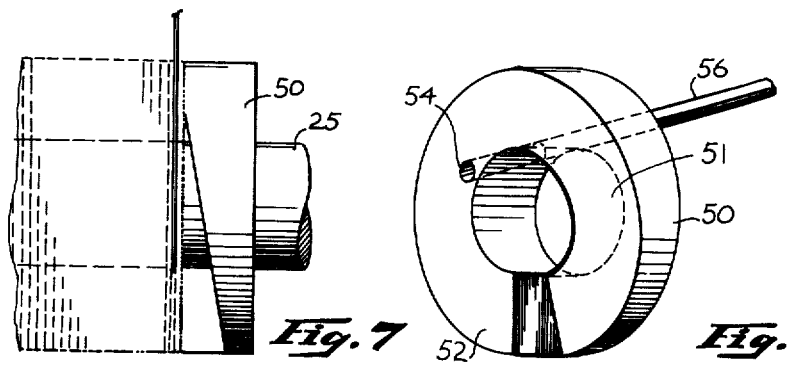
FIG. 6 is a fragmentary perspective view of a metal die element for use in the arrangement of FIGS. 1-3.
FIG. 7 is a fragmentary view of a portion of the arrangement of FIGS. 1-3, showing the metal die element of FIG. 6 and its relation to the wound structure and the strip material.

The guide wire 41 does not move solely in accordance with the movement of the carriage, but, in the region of the mandrel 25, the guide wire 41 comes into contact with a metal die 50 which is fixed to the frame 30 and which encompasses the mandrel 25. The metal die 50, best seen in FIGS. 6, 7 and 8 has a facing surface (on the side toward the turns of strip 34, 35) which serves both to control the position of the guide wire 41 and to exert pressure on the strip material. Thus, as best seen in FIG. 6, the inclined facing surface of the metal die 50 includes a guide surface portion 51 and a pressure surface portion 52, with the guide surface portion 51 being of gradually diminishing spacing from the wound structure in the region in which the guide wire 41 and the strips 34, 35 enter tangentially with respect to the mandrel 25.

The guide wire 41 is withdrawn from within the strips 34, 35 in the same region, so that the metal die 50 does not restrain the movement of the guide wire in this region. Intermediate to the entry and exit points of the guide wire 41, however, the pressure surface portion 52 of the facing surface of the metal die 50 maintains the wound structure in axial compression. As is described in greater detail below, this achieves partial densification and some adhesion between the partially cured coatings of the strips.

The rate of movement of the carriage 20, and thus of the metal die 50, is selected relative to the average rate at which the strip material is added on to be such that the metal die moves more slowly than the rate of buildup of the strip material. Partial densification and greater uniformity in the structure are achieved through the observation of this relationship.

The metal die 50 also includes an air aperture 54 extending into the facing surface adjacent to the outer surface of the mandrel 25. An air tube 56 (FIG. 6) coupled to the air aperture 54 blows air from a source (not shown) against the strips 34, 35 as they are added. The air clears the die 50 of resin powder deposited during the winding process.

Figure 5:
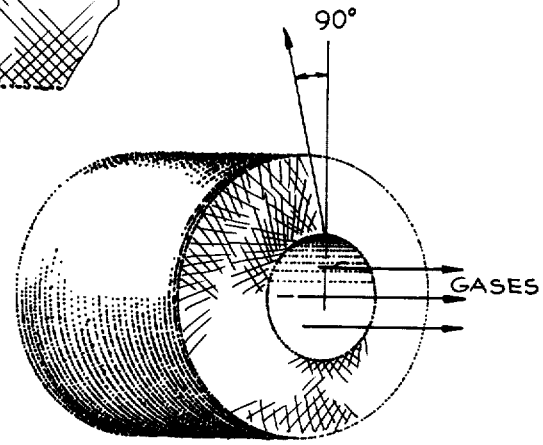
FIG. 5 is a perspective view, partially broken away, of a portion of a solid walled cylinder as constructed in accordance with the present invention, showing the relationship of the direction of lamination and the disposition of the individual fibers.

A better understanding of the disposition of the fibers which it is sought to achieve may be had by reference to FIG. 5, which shows a generally cylindrical structure, such as a rocket nozzle, through the interior of which hot gas is passed in the direction indicated by the appended arrows. A structure built up of silica fiber reinforcements from cloth material will have ring laminations, the direction of the laminations being said to be at 90° if the laminations lie in planes which are normal to the interior surface of the cylinder and thus normal to the direction of movement of the hot gases. As indicated in somewhat exaggerated fashion by the arrow which is inclined with respect to the 90° line, the direction of laminations may be inclined in the direction toward which the hot gases are moving. It is very desirable that each of the silica fibers have an end grain orientation, which, as described above, is best accomplished by having each of the fibers on a bias relative to the exposed surface. The nature of the end grain orientation varies with the type of material used. The fibers of roving materials might all be at 90° to an exposed surface, while the fibers of mat material would vary randomly but would be preponderantly of end grain orientation.

In fabricating a temperature and ablation resistant structure in accordance with the present invention, it is preferred for the present example to employ a silica fiber cloth which is coated with a partially cured phenolic resin, the so-called B-stage resin. Other coatings and resins, cured and otherwise might be employed if desired, however. Bolts of the cloth are first assembled by cutting the cloth diagonally into strips having twice the thickness desired for the roughly formed wound structure. A paper cutter has been found suitable for this cutting process, and it is preferred to cut on a 45° bias. The strip segments thus formed are united in end to end relation to form an essentially continuous strip, the term "essentially continuous" being used here simply to connote an extremely long total length of strip or distortable tape which is available for a continuing winding operation. When being placed in end to end relation, the individual strip segments are placed slightly overlapping with respect to each other, and sealed together at this overlapping portion.

Although strips may be sealed together in different ways, as by being sewn together, it is preferred to place the overlapping region under pressure and then to heat to a temperature sufficient to advance the cure of the resin. Thereafter, the pressure is maintained until the resin has cooled, after which the pressure is released and a firm joint exists. Thus the desired extremely long essentially continuous strip suitable for winding on a feed reel is provided. The strip has the fiber disposition and approximate overlapping relationship between adjacent segments which are shown in FIG. 4, although it will be recognized that the individual fibers in the cloth have been greatly enlarged for clarity.

In the next step a single strip, or two or more strips in facing relation, may be advanced into juxtaposition with a filamentary guide element, such as the guide wire. The strips may be folded along their length about the guide wire, and then fed tangentially to the rotating member which constitutes the central form for the final structure.

During the winding, the strips which are being added on to the structure are maintained under circumferential tension through the maintenance of tension on the filamentary guide element, and at the same time under axial compression exerted evenly as the wound structure is built up. The strips are wound helically upon the central form, with the flat sides of adjacent strips being together and the strips being edgewise relative to the surface of the central form.

As described in the present example, the filamentary guide element is continually withdrawn from the wound structure during the winding process. In some instances, however, withdrawal of the filament may not be desirable because the direction of laminations departs extensively from the normal, or because the width of the strip material tends to loosen the material during withdrawal of the filament. In such instances the guide element may be removed in the final machining of the structure. In other instances it may not be either feasible or desirable to withdraw the guide element, as where the guide element is a nylon strand of small diameter but high strength. The technique to be employed at this point thus may be varied with almost equal facility depending upon the configuration of the structure which is to be built up, the materials to be used, and the nature of the final machining step to be undertaken.

By maintaining the wound structure under axial compression, there is both a partial densification of the structure and a partial unification due to the adhesion of the adjacent resin coated strips. Although the densification pressure is applied at only a relative small area on the turns which are added on, it has been found that a partially cured resin maintains adhesion until the structure next revolves past the pressure area. This cold pressing technique therefore provides a rigid body when winding is completed, so that the structure may more easily be handled than would otherwise be the case. In addition, the partial densification which is achieved is sufficient for many applications, so that an additional densification step is not needed.

Where an additional densification step is needed, the partial densification by cold pressing aids in obtaining a higher final density. This densification may be accomplished in an autoclave or by a pressure bag or other well known treatment, while the wound structure is still on the mandrel. Thereafter, while still on the mandrel, the wound structure may have the resin contained therein cured to the final, C-stage condition. At this point the cured structure may be removed from the mandrel and machined to final dimensions, with a wire or other filamentary material being removed during this step.

It has been found that temperature and ablation resistant structures constructed in this manner have the advantages discussed above which are derived from the end grain orientation and inclined or controlled disposition of the individual fibers. In addition, the structures are of extremely high densities, which may be of the order of approximately one hundred pounds per cubic foot, and are uniform in density throughout the structure. There is significantly little wastage of material, because virtually no material is wasted in the preparation of the strips and the winding of the strips into the wound structure. Due to the extremely close control over the inner dimension of the wound structure, and because the outer dimension of the structure is substantially uniform, surface imperfections which must be taken off during the final machining process are kept to a very low proportion of the total structure. This means in addition that the rough or blank structure provided by the winding operation can be made to closely approach the final desired dimensions, so that time and expense are additionally saved by keeping the machining operation to a minimum.

The operation of the machine, as illustrated principally in FIGS. 1-3, proceeds continuously and automatically once a mandrel 25 has been set between the chuck 24 and the tail stock 16 on the base 10. The motor 14 continuously rotates the mandrel 25, and the movement of the carriage 20 controls the advance of the frame 30 and the remaining elements for moving and controlling the strips 34, 35 and the guide wire 41. In commencing operations, the leading edge of the strips 34, 35 may be set against the layup ring 26 portion of the mandrel 25, with the guide wire 41 being wrapped around once and affixed to the takeup reel 47 after being passed through the takeup guide 46. The constant torque motor 48 thus maintains the desired tension on the guide wire 41 and withdraws the guide wire 41 as the winding operation proceeds.

The strips 34, 35 are moved together through the metal strip guide elements 36, 37 to form a double layered strip to which is added the centrally disposed guide wire 41. The strips 34, 35 and the guide wire 41 move directly toward the mandrel 25 in a tangential direction, through the Teflon rollers 38-40 and into the Teflon fold guide 44, where the strips 34, 35 are folded about the guide wire 41 along their center line. The guide wire 41 diverts the folded strips 34, 35 from the tangential path into a circumferential path and holds the strips under tension sufficient to make a firm contact with them andrel 25. In addition, the guide wire 41 wedges the strips 34, 35 in between the wound structure and the guide surface portion 51 of the metal die. As the strips 34, 35 travel about the central axis with the mandrel 25, they are increasingly axially compressed by the pressure surface portion 52 of the metal die 50. As the guide wire 41 is then withdrawn from the turn of the strip material which is added to the wound structure, the strips 34, 35 remain in position, fitting tightly against the mandrel 25.

During this continual winding operation, air directed through the tube 56 and the air aperture 54 onto the facing surface of the metal die 50 blows away resin powder and particles so that there is no resin buildup and consequent tendency of the strip material to stick to the face of the metal die 50.

The winding therefore proceeds along the mandrel 25 substantially automatically, and without need for adjustment. When the winding has progressed along the length of the mandrel 25 to a point at which sufficient length of structure is available, the mandrel 25 may be removed for further processing in the manner above described. It should be noted that the same machine and method may be used with mandrels of different diameters, and mandrels having a varying diameter. In this connection it should also be noted that for ease of removal of the wound structure from the mandrel after curing, it is usually the practice to provide a slight taper so as to simplify the problem of removal. In some instances a Pliofilm or other plastic covering may be employed over the mandrel prior to winding, to prevent the resin which escapes from the wound structure during curing from causing the wound structure to stick to the mandrel.

While there have been described above and illustrated in the drawings various machines and methods in accordance with the invention for fabricating high temperature and ablation resistant structures utilizing a filamentary guide element and strips of bias-cut silica fiber cloth, other alternative arrangements for practicing the invention will readily suggest themselves to those skilled in the art. Therefore, the invention should be considered to include any and all variations, modifications, and equivalent arrangements falling within the scope of the appended claims.

What is claimed is:

1. A method of forming high temperature and ablation resistant structures from fabrics including the steps of folding diagonally cut strips of fabric along their length about a filament, feeding the filament and the folded strips edgewise on a central form which is rotating to build up the structure, and concurrently maintaining pressure on the strips in the direction toward the structure as it is being built up.

2. The method of forming high temperature and ablation resistant structures from fiber fabrics including the steps of cutting the fiber fabrics into separate biased strips, joining the ends of successive strips together to form a substantially continuous biased strip, folding the continuous biased strip of fabric about a central reinforcing member, winding the central reinforcing member and the folded strip about a rotating central form, and concurrently pressing in the direction toward the built up structure on the flat side of the folded strip which is being added.

3. A method of forming hollow, solid walled silica fiber reinforced structures from silica fiber fabric including the steps of cutting a resin coated silica fiber fabric diagonally into strips, joining the strips in end to end relation to form a substantially continuous strip, folding the substantially continuous strip along its length about a filament, winding the filament and the folded strip helically upon a rotating mandrel, maintaining a substantially constant compression against the wound strips as the structure is being built up, and withdrawing the filament continually from the mandrel as the winding proceeds.

4. The method of forming a resin impregnated silica fiber reinforced structure with the fibers having a selected angular relation relative to particular surfaces of the structure including the steps of cutting a resin coated silica fiber fabric on a bias into elongated strips, the bias establishing the silica fibers therein in the desired selected angular relation to the edge of the strip, cold sealing overlapping edges of successive strips in end to end relation to form a substantially continuous biased strip, placing at least two of the substantially continuous strips together in facing relation, folding the facing strips along their length about a guide wire which is fed along with the strips, winding the guide wire in a single turn about a rotating mandrel, so that the folded strips are helically wound in edgewise relation to the mandrel and about the mandrel, concurrently maintaining an axial pressure in the direction of the helically wound structure thus defined, and taking up the guide wire under constant tension subsequent to the single turn about the rotating mandrel.

5. A method of fabricating a hollow symmetrical resin impregnated silica fiber reinforced structure in which the fibers are disposed with selected end orientations to a given surface of the structure which includes the steps of cutting a woven silica fiber cloth which is coated with a partially cured resin into individual strips which extend diagonally with respect to the weave of the cloth, placing successive individual strips in overlapping end to end relation, sealing the overlapping edges together by heating the overlapping edges under pressure and maintaining the pressure until after the edges have cooled to form an essentially continuous strip, forming a double-layered strip by feeding two of the essentially continuous strips together in a facing relation, adding a guide filament along the longitudinal center of the double-layered strips about the guide filament, continuously feeding the guide filament and the double-layered strips onto a rotating mandrel, with the folded edge of the strips being in edgewise relation to the rotating mandrel so that the strips are wound helically upon the mandrel to build up a hollow symmetrical structure, the guide filament being passed in a single turn around the mandrel, taking up the guide filament under controlled tension to draw the folded strips against the rotating mandrel tightly, continually compressing the wound structure by pressing the turn of strip which is being wound upon the mandrel in toward the remaining windings of the strip, fully curing the resin of the fully wound structure while on the mandrel, removing the wound structure from the mandrel, and machining the structure to final dimensions.

6. A machine for forming a structure in the configuration of a surface of revolution consisting of a fiber reinforced structure in which the fibers lie in laminations which have a selected angle relative to the central axis of the surface of revolution and in which the fibers have selected radial dispositions relative to the central axis, the machine including in combination a rotatable central form, means supplying at least one continuous strip of bias-cut cloth material having a partially cured resin coating, means for feeding a guide wire adjacent the strip material, guide means disposed tangentially relative to the rotatable central form for feeding the strip material and the guide wire onto the rotatable central form with the strip being folder over the guide wire and the edge of the fold being disposed edgewise to the central form, and means coupled to the wire and disposed adjacent the rotatable central form for withdrawing the wire under tension after a selected number of turns about the rotatable central form.

7. A machine for forming fiber reinforced structure in the configuration of a surface of revolution, the machine including in combination a rotatable central form, means for feeding a strip material toward the rotatable central form, means for feeding a filamentary material along the length of and adjacent to the strip material, the filamentary material being wound at least once about the rotatable central form, guide means disposed along the path of the strip material and the filamentary material for folding the strip material over the filamentary material, and means coupled to the filamentary material after turning about the rotatable central form for withdrawing the filamentary material under tension to leave the strip material on the rotatable central form.

8. A machine for forming a fiber glass reinforced structure in the configuration of a surface of revolution in which structure the fibers lie in laminations having a selected angle relative to the central axis of the surface of revolution and in which the fibers also have selected radial dispositions relative to the central axis, the machine including in combination a rotatable central form, means for feeding at least two strips of bias-cut fiber glass cloth material having a partially cured resin coating, means for feeding a wire material, guide means positioned between the means for feeding strip material and the wire material for folding the strip material about the wire material, the wire material being disposed in at least one turn about the rotatable central form, takeup means coupled to the wire material and operable to withdraw the wire under a selected amount of tension from the strip material wound upon the rotatable central form, and pressure means disposed along the path of winding of the strip material and coupled mechanically to the rotatable central form for pressing against the flat side of the turn of strip which is being added to axially compress the structure as the strips are wound upon the rotatable central form, the means including a surface pressing against the strip material which has the selected angle relative to the central axis of the surface of revolution.

9. A machine for assembling a laminated cylindrical structure of a selected thickness and a controlled inner dimension, the machine including a rotatable cylindrical mandrel, means providing distortable tape material, means providing filamentary material, means disposed adjacent to the mandrel surface for guiding the strip material and filamentary material thereto tangentially to the mandrel to helically wind the strip material about the mandrel with the strip material folded over the filamentary material, means for moving the means providinng tape material and the means providing filamentary material axially along the mandrel at a controlled rate as the tape material is wound onto the mandrel, and means coupled to the means for moving and bearing against the tape material as it is wound upon the mandrel to axially compress the wound structure.

10. A machine for constructing a solid walled structure from fabric strips including the combination of a rotating center member on which the strip may be wound to form a laminated wall in which the direction of laminations is at an angle to the surface of the center member, tensioned filamentary guide means fed longitudinally along the strip and about the rotating center member to maintain the strip under tension and to guide the strip upon the rotating center member, means for folding the strip about the filamentary guide means, means positioned along the path of movement of the turn of strip which is being added onto the wound structure for pressing the laminations together, and means coupled to the rotating center member and to the means for pressing for maintaining the pressure which is exerted substantially uniform as the winding progresses.

11. A machine for forming structures in the configuration of surfaces of revolution made up of fibre reinforced materials in which the fibers lie in laminations having a selected angle relative to the central axis of the surface of revolution and in which the fibers also have selected radial dispositions relative to the central axis, the machine including in combination a frame structure, a rotatable central form mounted along a central axis of the frame structure, a carriage device mounted on the frame structure and movable parallel to the central axis adjacent the rotatable central form, means coupling the rotatable central form to the carriage device to move the carriage device axially along the central form at a rate proportional to the rate of rotation of the central form, a feed reel coupled to the carriage device and movable therewith, the feed reel providing strips of bias-cut cloth material coated with a partially cured resin, a filament feed reel coupled to the carriage device and movable therewith, guide means mounted on and movable with the carriage between the feed reel and the central form and positioned to guide the strips and filament together, with the strips being folded along their length about the filament, and with the filament being disposed in a tangential position relative to the central form, such that the folded over strips are helically wound upon the central form edgewise as the central form rotates, a pressure device coupled to the carriage, the pressure device including a shaped surface positioned to bear against and guide the filament as it is fed onto the central form, and shaped also to press the laminations into a selected angle relative to the central axis of the surface of revolution.

12. A machine for forming a relatively thick walled structure having the form of a surface of revolution about a central axis and consisting of a fiber reinforced resinous body, the fibers in which are disposed as ring laminations having a selected angle to the axis of the surface of revolution, the machine including in combination a rotatable central form having the approximate dimensions desired for the inner surface of the surface of revolution, means for feeding at least two strips of resin coated fiber cloth which is cut on a bias to the vicinity of the central form with the strips lying parallel and adjacent to each other, means for feeding an elongated material centrally along the length of the strips and adjacent thereto, means positioned along the length of the strips and the elongated material for folding the strips over the elongated material, means coupled to the elongated material for turning the elongated material about the rotatable central form, the elongated material being maintained under tension, so that the folded over strip material is wound helically upon the rotatable central form edgewise to the rotatable central form, a carriage mechanism movable at a selected controlled rate proportional to the speed of rotation to the central form and adjacent to the central form, and means coupled to the carriage mechanism and positioned adjacent the rotatable central form at a point adjacent a point at which the elongated material is added onto the rotatable central form as the carriage mechanism moves, the means including a surface for guiding the elongated material and axially compressing the strip being helically wound upon the rotatable central form.

13. A machine for forming structures in the configuration of surfaces of revolution including the combination of a frame, a mandrel mounted along a central axis along the frame, a motor coupled to the mandrel adjacent to a first end thereof for rotating the mandrel at a selected rate, a carriage device mounted on the frame and slideable therealong parallel to the mandrel, a lead screw device extending parallel to the central axis and mechanically coupled to the motor and to the carriage device for moving the carriage device at a selected axial rate proportioned to the rate of rotation of the mandrel, the proportion being selected in accordance with the average rate desired for the addition of material to be formed on the mandrel, a pair of strip feed reels spaced apart from the mandrel and coupled to and movable with the carriage, means positioned adjacent the strip feed reels for guiding the strips together in facing relation, a filament feed reel spaced apart from the mandrel and coupled to and movable with the carriage, means positioned adjacent the facing strip materials for guilding the filament to a central lengthwise disposition relative to the strip material, guide means disposed adjacent the facing strips and the adjacent wire for folding the strips over the filament, the filament being disposed in a single turn about the mandrel, filament takeup means coupled to receive the filament wound about the mandrel, the filament takeup means maintaining a substantially constant tension on the mandrel, so that the strip material is wound edgewise upon and helically about the mandrel while the filament is withdrawn therefrom after the single turn, the takeup means being coupled to and movable with the carriage, and a metal guide and pressure die coupled to and movable with the carriage, the guide and pressure die being positioned at a point such that the material is inserted and wound tightly relative to the adjacent turns of strip material, and including a surface which presses against the turn being added in a selected direction.

References Cited in the file of this patent

UNITED STATES PATENTS

| | | |
|---|---|---|
| 1,337,067 | Guay | Apr. 13, 1920 |
| 1,665,585 | Esch | Apr. 10, 1928 |
| 1,670,061 | Carroll | May 15, 1928 |
| 2,236,901 | Hall | Apr. 1, 1941 |
| 2,380,111 | Kasten | July 10, 1945 |
| 2,726,978 | Skinner | Dec. 13, 1955 |

FOREIGN PATENTS

| | | |
|---|---|---|
| 1,151,096 | France | Aug. 24, 1915 |

UNITED STATES PATENT OFFICE

CERTIFICATE OF CORRECTION

Patent No. 3,111,442             November 19, 1963

Ernest A. Voisin

It is hereby certified that error appears in the above numbered patent requiring correction and that the said Letters Patent should read as corrected below.

Column 6, line 28, for "fromed" read -- formed --; column 8, line 5, for "them andrel" read -- the mandrel --; line 70, after "reinforced" insert -- resin impregnated --; column 9, line 67, for "folder" read -- folded --; column 10, line 46, for "providinng" read -- providing --; column 12, line 1, for "strip" read -- strips --; line 22, for "guilding" read -- guiding --.

Signed and sealed this 12th day of May 1964.

(SEAL)
Attest:
ERNEST W. SWIDER

Attesting Officer

EDWARD J. BRENNER
Commissioner of Patents